United States Patent
Bhattacharyya et al.

(10) Patent No.: US 12,482,253 B2
(45) Date of Patent: Nov. 25, 2025

(54) USING GROUNDED RATIONALES TO IMPROVE VISUAL REASONING

(71) Applicant: QUALCOMM Incorporated, San Diego, CA (US)

(72) Inventors: Apratim Bhattacharyya, San Diego, CA (US); Roland Memisevic, Toronto (CA); Sunny Praful Kumar Panchal, Toronto (CA); Reza Pourreza, San Diego, CA (US); Mingu Lee, San Diego, CA (US); Pulkit Madan, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 270 days.

(21) Appl. No.: 18/500,986

(22) Filed: Nov. 2, 2023

(65) Prior Publication Data

US 2024/0386712 A1 Nov. 21, 2024

Related U.S. Application Data

(60) Provisional application No. 63/467,159, filed on May 17, 2023.

(51) Int. Cl.
*G06V 10/82* (2022.01)
*G06F 40/10* (2020.01)
*G06F 40/284* (2020.01)

(52) U.S. Cl.
CPC .............. *G06V 10/82* (2022.01); *G06F 40/10* (2020.01); *G06F 40/284* (2020.01)

(58) Field of Classification Search
CPC ........ G06V 10/82; G06F 40/10; G06F 40/284
USPC .......................................................... 382/103
See application file for complete search history.

(56) References Cited

U.S. PATENT DOCUMENTS

2020/0404243 A1* 12/2020 Saphier ................ A61C 9/0053
2021/0397944 A1* 12/2021 Lakshmanan ......... G06F 16/355

OTHER PUBLICATIONS

Alayrac J.B., et al., "Flamingo: Visual Language Model for Few-shot Learning", arXiv:2204.14198v2 (cs.CV), 36th Conference on Neural Information Processing Systems, IPS2022, Nov. 15, 2022, pp. 1-54.
Zhang Z., et al., "Multimodal Chain-of-Thought Reasoning in Language Models", arXiv:2302.00923v4 (cs.CL) Feb. 17, 2023, 19 Pages.

(Continued)

*Primary Examiner* — Charlotte M Baker
(74) *Attorney, Agent, or Firm* — Seyfarth Shaw LLP

(57) ABSTRACT

A processor-implemented method for generating grounded rationales for visual reasoning tasks includes receiving, by a first artificial neural network (ANN), an interleaved sequence of images and textual information. The first ANN extracts grid features of the images of the interleaved sequence of the images and the textual information to generate a representation of the interleaved sequence of the images and the textual information based on the grid features. A second ANN maps the grid features to a textual domain. The second ANN extracts visual information of the interleaved sequence of the images and the textual information based on the grid features in the textual domain. The second ANN determines a rationale based on the visual information. The visual information comprises one or more lower-level surrogate tasks.

30 Claims, 7 Drawing Sheets

(56) References Cited

OTHER PUBLICATIONS

Bhattacharyya A., et al., "Look, Remember and Reason: Visual Reasoning with Grounded Rationales", arXiv:2306.17778v1 [cs.CV] Jun. 30, 2023, Arxiv.Org, Cornell University Library, 201 Olin Library Cornell University Ithaca, NY 14853, Jun. 30, 2023, pp. 1-17.
Driess D., et al., "PaLM-E: An Embodied Multimodal Language Model", arXiv:2303.03378v1 [cs.CV], Mar. 6, 2023, 18 Pages.
International Search Report and Written Opinion—PCT/US2024/022046—ISA/EPO—Jul. 19, 2024.

* cited by examiner

USING GROUNDED RATIONALES TO IMPROVE VISUAL REASONING

CROSS-REFERENCE TO RELATED APPLICATION

The present application claims the benefit of U.S. Provisional Patent Application No. 63/467,159, filed on May 17, 2023, and titled "USING GROUNDED RATIONALES TO IMPROVE VISUAL REASONING," the disclosure of which is expressly incorporated by reference in its entirety.

FIELD OF THE DISCLOSURE

Aspects of the present disclosure generally relate to artificial neural networks, and more specifically to using grounded rationales to improve visual reasoning.

BACKGROUND

Artificial neural networks may comprise interconnected groups of artificial neurons (e.g., neuron models). The artificial neural network may be a computational device or be represented as a method to be performed by a computational device. Convolutional neural networks (CNNs) are a type of feed-forward artificial neural network. Convolutional neural networks may include collections of neurons that each have a receptive field and that collectively tile an input space. Convolutional neural networks, such as deep convolutional neural networks, have numerous applications. These neural network architectures are used in various technologies, such as image recognition, speech recognition, acoustic scene classification, keyword spotting, autonomous driving, and other classification tasks.

Given the many useful applications of neural networks, there is increasing demand for use of neural networks to solve increasingly complex problems in further areas of application. One challenge in expanding the use of neural network involves training. Neural networks use a large amount of data training examples to learn each task. Obtaining large training data sets may be costly and time consuming. Attempts have been made to improve training of neural network models with less training examples. One area of exploration is reasoning. Neural network reasoning attempt to mimic more closely the manner in which humans learn information such as by way of deductive reasoning. Neural reasoning attempts to utilize the data examples in the training data set as well as related information such as contextual information to enhance the neural model learning.

Visual reasoning tasks may test the capability of a learning process to infer causal relations, detect object interactions, and understand temporal dynamics based on visual cues. That is, humans may solve problems through a multi-step reasoning process in which humans may attend to and extract visual information on a step-by-step basis. However, because of the information density of the visual domain, it is challenging to use such information to enhance neural network training.

SUMMARY

The present disclosure is set forth in the independent claims, respectively. Some aspects of the disclosure are described in the dependent claims.

In some aspects of the present disclosure, a processor-implemented method includes receiving, by a first artificial neural network (ANN), an interleaved sequence of images and textual information. The processor-implemented method also includes extracting, by the first ANN, grid features of the images of the interleaved sequence of the images and the textual information to generate a representation of the interleaved sequence of the images and the textual information based on the grid features. The processor-implemented method additionally includes mapping, by a second ANN, the grid features to a textual domain. The processor-implemented method further includes extracting, by the second ANN, visual information of the interleaved sequence of the images and the textual information based on the grid features in the textual domain. The processor-implemented method still further includes determining, by the second ANN, a rationale based on the visual information of the interleaved sequence of images and the textual information. The visual information includes one or more lower-level surrogate tasks.

Various aspects of the present disclosure are directed to an apparatus including means for receiving, by a first artificial neural network (ANN), an interleaved sequence of images and textual information. The apparatus also includes means for extracting, by the first ANN, grid features of the images of the interleaved sequence of the images and the textual information to generate a representation of the interleaved sequence of the images and the textual information based on the grid features. The apparatus additionally includes means for mapping, by a second ANN, the grid features to a textual domain. The apparatus further includes means for extracting, by the second ANN, visual information of the interleaved sequence of the images and the textual information based on the grid features in the textual domain. The apparatus still further includes means for determining, by the second ANN, a rationale based on the visual information of the interleaved sequence of images and the textual information. The visual information includes one or more lower-level surrogate tasks.

In some aspects of the present disclosure, a non-transitory computer-readable medium with non-transitory program code recorded thereon is disclosed. The program code is executed by a processor and includes program code to receive, by a first artificial neural network (ANN), an interleaved sequence of images and textual information. The program code also includes program code to extract, by the first ANN, grid features of the images of the interleaved sequence of the images and the textual information to generate a representation of the interleaved sequence of the images and the textual information based on the grid features. The program code additionally includes program code to map, by a second ANN, the grid features to a textual domain. The program code further includes program code to extract, by the second ANN, visual information of the interleaved sequence of the images and the textual information based on the grid features in the textual domain. The program code still further includes program code to determine, by the second ANN, a rationale based on the visual information of the interleaved sequence of images and the textual information. The visual information includes one or more lower-level surrogate tasks.

Various aspects of the present disclosure are directed to an apparatus having at least one memory and one or more processors coupled to the at least one memory. The processor(s) is configured to receive, by a first artificial neural network (ANN), an interleaved sequence of images and textual information. The processor(s) is also configured to extract, by the first ANN, grid features of the images of the interleaved sequence of the images and the textual information to generate a representation of the interleaved sequence of the images and the textual information based on the grid features. The processor(s) is additionally configured to map, by a second ANN, the grid features to a textual domain. The processor(s) is further configured to extract, by the second ANN, visual information of the interleaved sequence of the images and the textual information based on the grid features in the textual domain. Furthermore, the processor(s) is configured to determine, by the second ANN, a rationale based on the visual information of the interleaved sequence of images and the textual information, the visual information comprising one or more lower-level surrogate tasks.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
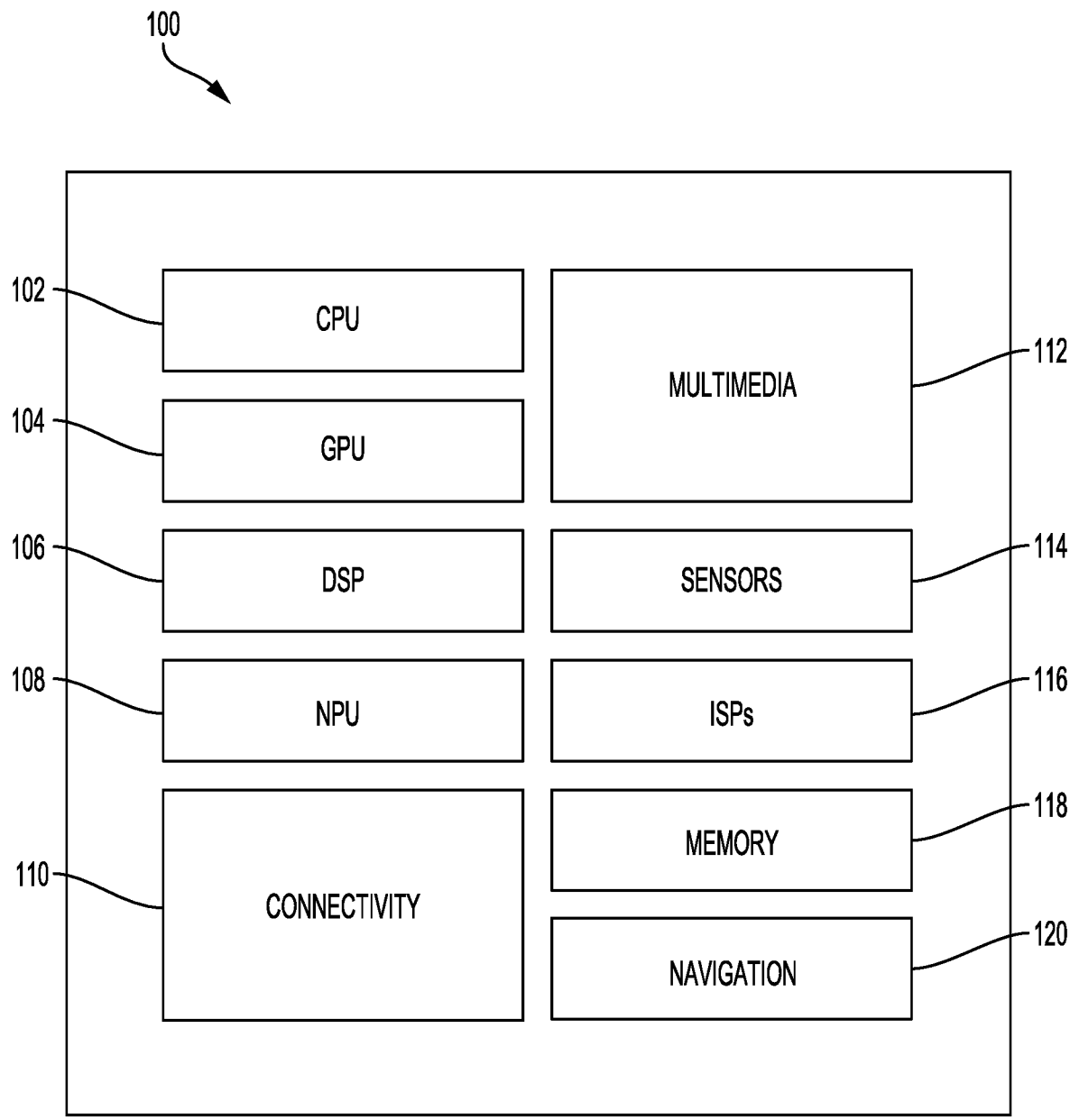
FIG. 1 illustrates an example implementation of a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks, and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As described, visual reasoning tasks may test the capability of a learning process to infer causal relations, detect object interactions, and understand temporal dynamics based on visual cues. Visual reasoning tasks may include tasks such as tracking objects under severe occlusion or answering questions that involve visual reasoning. Visual reasoning tasks may involve uncovering causal structures, for example, which object activates the machine. Because of the information density of the visual domain, visual reasoning tasks may be challenging to perform.

Autoregressive large language models (LLMs) have shown positive results on various reasoning tasks such as on grade school math problems and the Law School Admission Test (LSAT). Language models for these problems, however, process only textual data to reason and generate solutions to the target tasks. Many real-world scenarios utilize reasoning over complex domains that involve various heterogeneous sensory inputs (e.g., perceptual cues and language).

Recently, multi-modal LLMs that model information from the textual and visual domains have been proposed to solve multi-modal tasks. However, such conventional multi-modal LLMs may only perform well on tasks that involve global visual-textual relationships, such as captioning and dialogue. However, the conventional multi-modal LLMs may fail in tasks that use fine-grained visual inferences and demand a detailed understanding of spatio-temporal relationships between objects in a scene.

Accordingly, to address these and other challenges, aspects of the present disclosure are directed to generating a rationale for visual reasoning tasks using artificial neural networks.

Particular aspects of the subject matter described in this disclosure can be implemented to realize one or more of the following potential advantages. In some examples, the described techniques may be applied beneficially to visual reasoning tasks including tracking objects under severe occlusion, determining causal structures (e.g., determining an object that activates a machine in a sequence of interleaved image and textual data), as well as answering queries that utilize visual reasoning. Moreover, the described techniques may reduce memory consumption as well as latency.

FIG. 1 illustrates an example implementation of a system-on-a-chip (SOC) 100, which may include a central processing unit (CPU) 102 or a multi-core CPU configured for determining a rationale for visual reasoning tasks using an artificial neural network. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In aspects of the present disclosure, the instructions loaded into the general-purpose processor 102 may include code to receive, by a first artificial neural network (ANN), an interleaved sequence of images and textual information. The general-purpose processor 102 may also include code to extract, by the first ANN, grid features of the images of the interleaved sequence of the images and the textual information to generate a representation of the interleaved sequence of the images and the textual information based on the grid features. The general-purpose processor 102 may also include code to map, by a second ANN, the grid features to a textual domain. The general-purpose processor 102 may also include code to extract, by the second ANN, visual information of the interleaved sequence of the images and the textual information based on the grid features in the textual domain. The general-purpose processor 102 may include code to determine, by the second ANN, a rationale based on the visual information. The visual information comprises one or more lower-level surrogate tasks.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular lower-level features of an input.

Figure 2A:
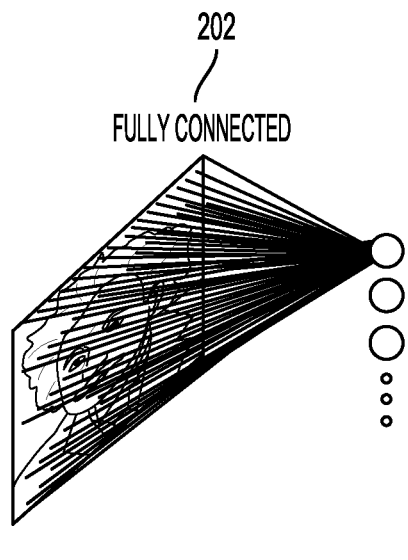
FIGS. 2A, 2B, and 2C are diagrams illustrating a neural network in accordance with various aspects of the present disclosure.
Figure 2B:
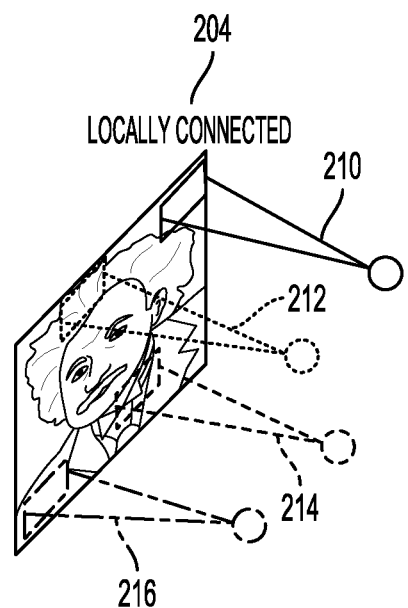

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer because the higher layer neurons in a given region may receive inputs that are tuned through training to the properties of a restricted portion of the total input to the network.

Figure 2C:
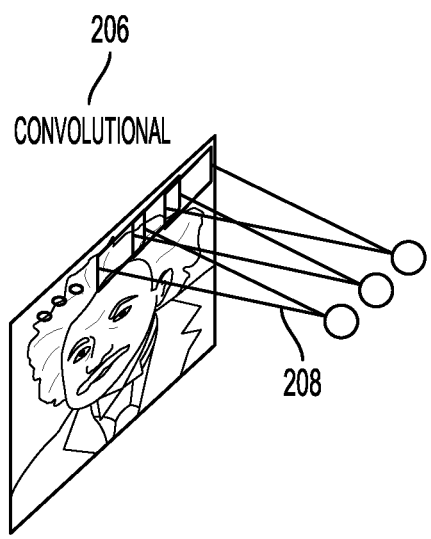

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
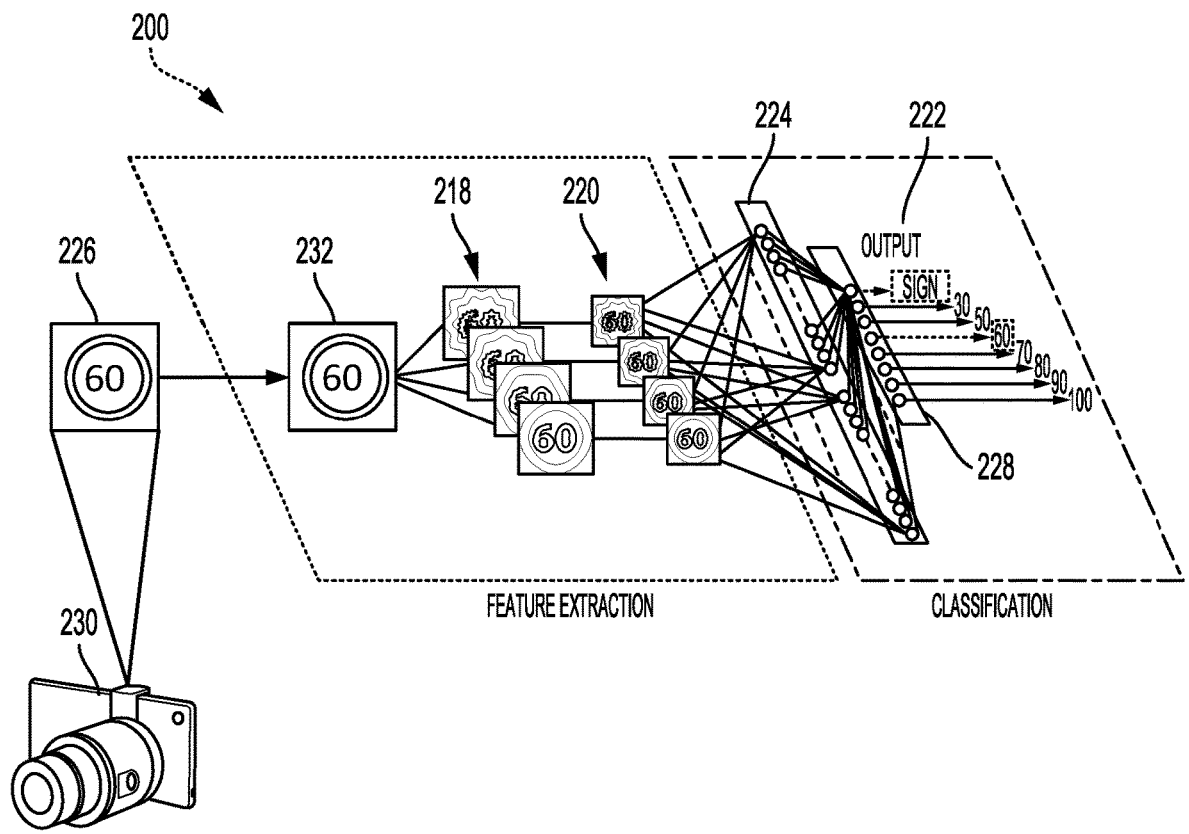
FIG. 2D is a diagram illustrating an exemplary deep convolutional network (DCN) in accordance with various aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 may be a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 may likely be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN 200 may be presented with new images and a forward pass through the DCN 200 may yield an output 222 that may be considered an inference or a prediction of the DCN 200.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

Figure 3:
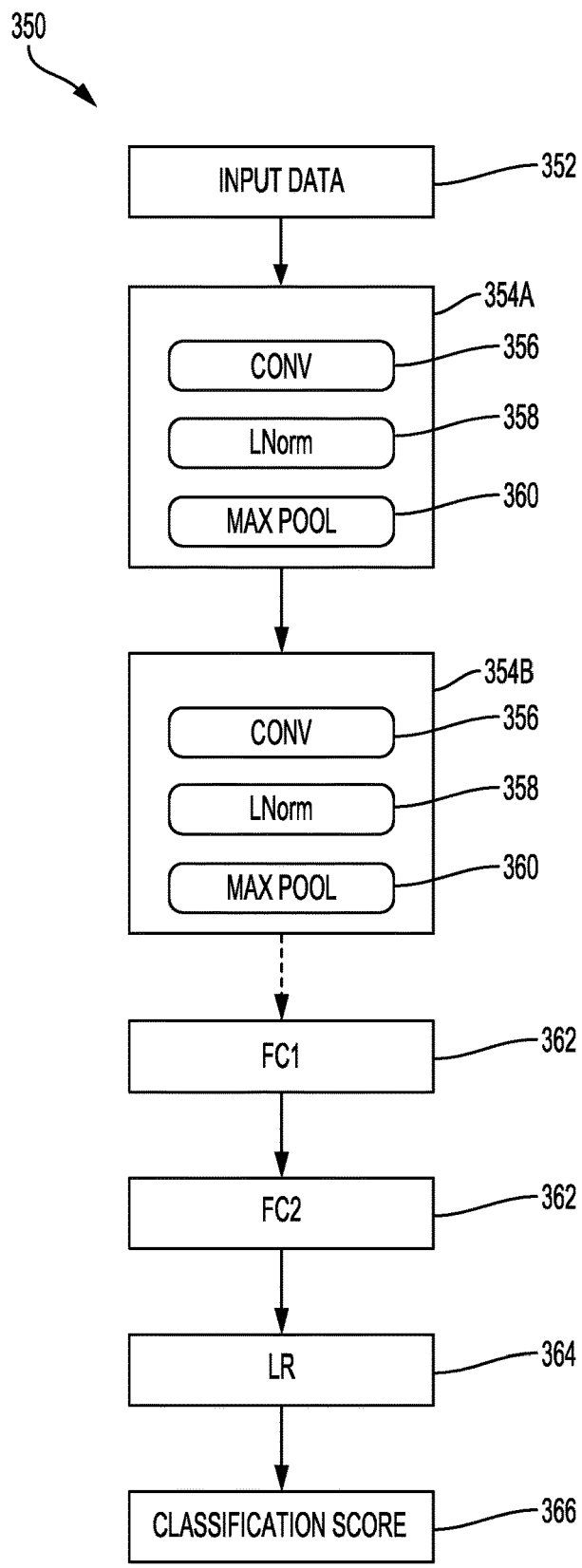
FIG. 3 is a block diagram illustrating an exemplary deep convolutional network (DCN) in accordance with various aspects of the present disclosure.

FIG. 3 is a block diagram illustrating a DCN 350. The DCN 350 may include multiple different types of layers based on connectivity and weight sharing. As shown in FIG. 3, the DCN 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

Although only two of the convolution blocks 354A, 354B are shown, the present disclosure is not so limiting, and instead, any number of the convolution blocks 354A, 354B may be included in the DCN 350 according to design preference.

The convolution layers 356 may include one or more convolutional filters, which may be applied to the input data to generate a feature map. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a DCN may be loaded on a CPU 102 or GPU 104 of an SOC 100 (e.g., FIG. 1) to achieve high performance and low power consumption. In alternative embodiments, the parallel filter banks may be loaded on the DSP 106 or an ISP 116 of an SOC 100. In addition, the DCN 350 may access other processing blocks that may be present on the SOC 100, such as sensor processor 114 and navigation module 120, dedicated, respectively, to sensors and navigation.

The DCN 350 may also include one or more fully connected layers 362 (FC1 and FC2). The DCN 350 may further include a logistic regression (LR) layer 364. Between each layer 356, 358, 360, 362, 364 of the DCN 350 are weights (not shown) that are to be updated. The output of each of the layers (e.g., 356, 358, 360, 362, 364) may serve as an input of a succeeding one of the layers (e.g., 356, 358, 360, 362, 364) in the DCN 350 to learn hierarchical feature representations from input data 352 (e.g., images, audio, video, sensor data and/or other input data) supplied at the first of the convolution blocks 354A. The output of the DCN 350 is a classification score 366 for the input data 352. The classification score 366 may be a set of probabilities, where each probability is the probability of the input data including a feature from a set of features.

Figure 4:
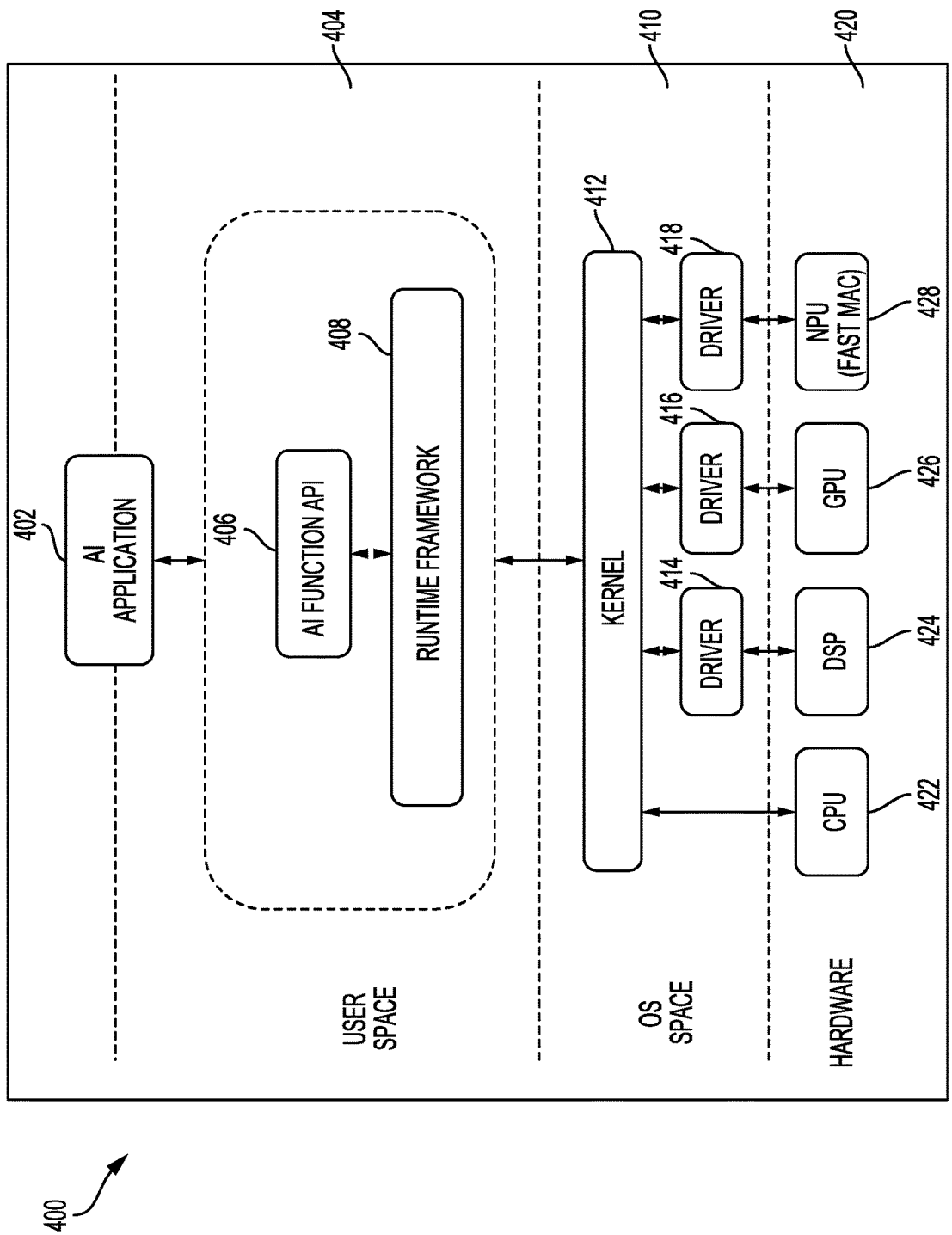
FIG. 4 is a block diagram illustrating an exemplary software architecture that may modularize artificial intelligence (AI) functions, in accordance with various aspects of the present disclosure.

FIG. 4 is a block diagram illustrating an exemplary software architecture 400 that may modularize artificial intelligence (AI) functions. Using the architecture 400, applications may be designed that may cause various processing blocks of an SOC 420 (for example a CPU 422, a DSP 424, a GPU 426 and/or an NPU 428) to support determining a rationale for visual reasoning tasks using an artificial neural network for an AI application 402, according to aspects of the present disclosure. The architecture 400 may, for example, be included in a computational device, such as a smartphone.

The AI application 402 may be configured to call functions defined in a user space 404 that may, for example, provide for the detection and recognition of a scene indicative of the location at which the computational device including the architecture 400 currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine 408, for example, to request an inference at a particular time interval or triggered by an event detected by the user interface of the AI application 402. When caused to provide an inference response, the run-time engine 408 may in turn send a signal to an operating system in an operating system (OS) space 410, such as a Kernel 412, running on the SOC 420. In some examples, the Kernel 412 may be a LINUX Kernel. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

Aspects of the present disclosure are directed to generating a rationale for visual reasoning tasks using an artificial neural network (ANN). Aspects of the present disclosure may break down complex visual reasoning tasks into simplified steps. An ANN model may be trained on surrogate tasks in a form of generating rationales about spatial and/or spatio-temporal relationships present in a stream of data including visual information.

In accordance with aspects of the present disclosure, large language models (LLMs) may be trained to solve visual reasoning tasks by breaking down complex visual reasoning problems into simpler ones in a step-by-step process, and at the same time, mapping relevant visual information from the visual domain to the textual domain. Spatial grid level visual features may be used in conjunction with rationale-based training to guide the LLM in extracting relevant spatial and temporal visual features.

In some aspects, high-level and symbolic reasoning capabilities in neural networks may take the form of emergent techniques. Rather than being addressed through architectural considerations (e.g., by having a dedicated processing module for a certain sub-task), these capabilities may emerge in the ANN, in response to training on many relevant, related training tasks. In accordance with aspects of the present disclosure, high-level reasoning and perceptual capabilities may be utilized as an appropriate set of relevant surrogate tasks for training the ANN. Perceptual capabilities may broaden the set of tasks a given ANN architecture may solve. For instance, perceptual capabilities may enable a computationally simple ANN architecture to perform a wide range of tasks, and in some aspects, complex tasks.

In some aspects, the artificial neural network architecture may be designed to map to power-efficient accelerator hardware. For example, an ANN that processes the input through relatively simple, homogeneous computations (for example, a large array of convolution operations, combined with cross-attention layers to map to a language model) may be trained to perform complex perceptual reasoning tasks. Accordingly, aspects of the present disclosure may reduce the demand for use-case information with complex compiler functionality and the support of a wide range of operators.

Consider a visual reasoning problem where the objective is to correctly answer whether the query objects would activate a "Blicket" detector. A blicket detector emits light and plays music when certain objects are placed on top of the detector. Humans may solve this problem through a multi-step reasoning process by attending to and extracting visual information step-by-step using lower-level visual capabilities, such as object recognition and re-identification. For example, one strategy that humans may follow to solve such a problem is to: first, read the question; inspect the scene to create an overview of the present objects as well as any relevant lower-level visual information; memorize the relevant information along the way; and finally, state the answer based on the extracted information. Such a reasoning process may aid in dealing with both the complexity of the task and the need to filter the rich visual data for relevant information. In short, such a reasoning process can be thought of as including intermediate sub-tasks which may be referred to as "look, remember, reason (LRR)"—looking for relevant visual cues, remembering the relevant cues along the way, and aggregating the collected information to reason and determine an answer. In various aspects of the present disclosure, uni-modal large language models (LLMs) for texts may be boosted to perform general-purpose multi-modal visual reasoning by augmenting the LLMs with lower-level visual capabilities.

For instance, an off-the-shelf LLM may be equipped with the lower-level visual capabilities to solve a diverse range of visual reasoning tasks. In some aspects, the LLM may be trained indirectly using surrogate tasks expressed in natural language for the generation of relevant rationales that follow the reasoning process of "look, remember, reason" and may be grounded in the visual input. An adapter module may be provided to enable top-down attention controlled by the LLM. Accordingly, the configured LLM, which may be considered a general-purpose LRR model may perform varied visual reasoning tasks, including (but not limited to) spatial reasoning, temporal reasoning, and causal visual reasoning.

To enable visual reasoning by exploiting the highly expressive LLMs, a "look, remember, reason (LRR)" framework is presented. The LRR model may be based on a pre-trained LLM backbone, with additional cross-attention layers to enable processing of multi-modal inputs. To address the challenges presented by visual reasoning problems, rationales obtained from multi-modal inputs may be used. Unlike conventional approaches, the rationales may additionally include lower-level visual surrogate tasks expressed in natural language to enable visual reasoning tasks. The rationales may be supported by a top-down attention mechanism that allows high-level concepts to modulate a perceptual pathway.

Figure 5:
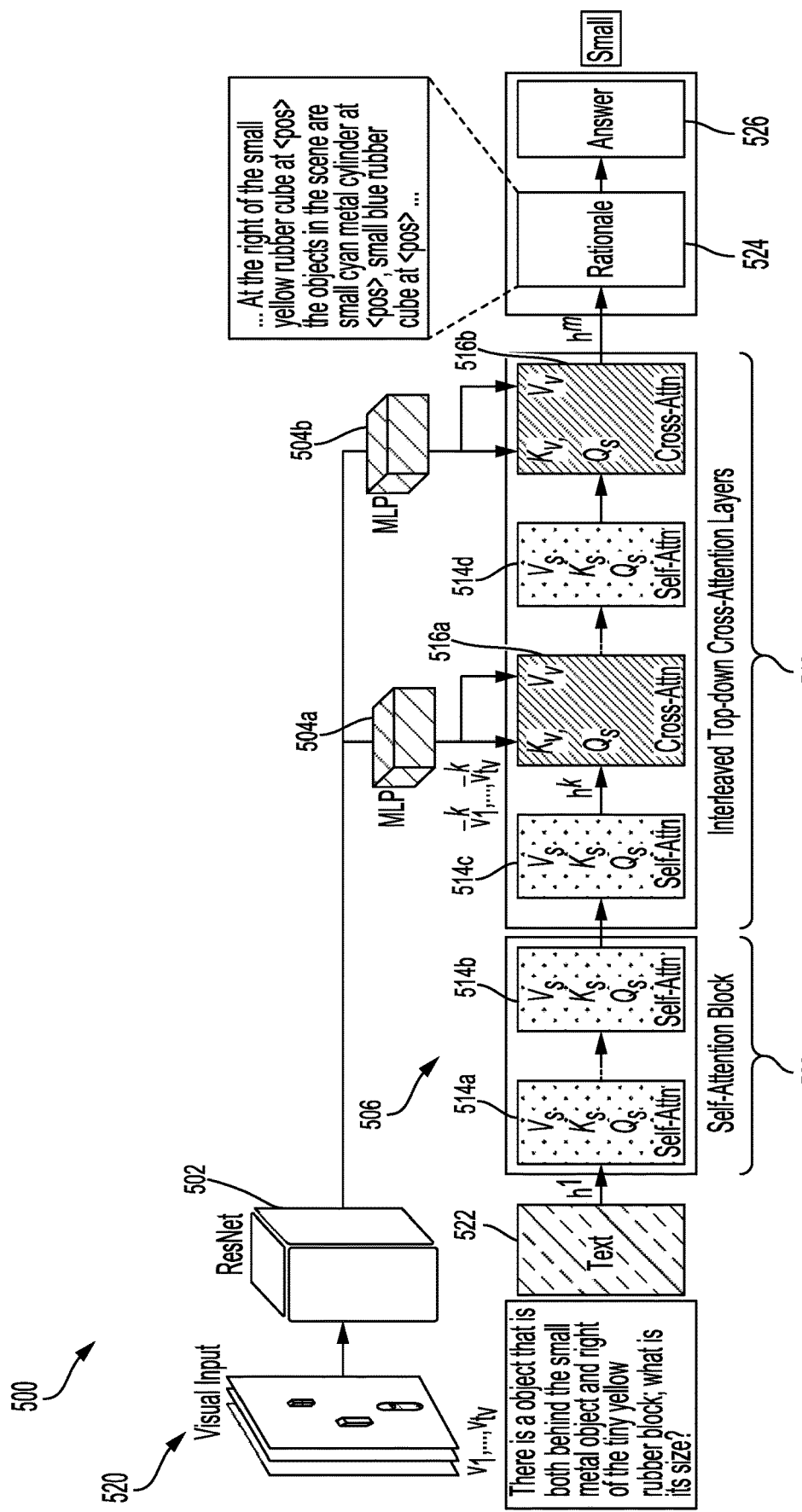
FIG. 5 is a block diagram illustrating an example architecture of a multi-modal large language model (LLM), in accordance with various aspects of the present disclosure.

FIG. 5 is a block diagram illustrating an example architecture of a multi-modal LLM model 500, in accordance with various aspects of the present disclosure. Referring to FIG. 5, the multi-modal LLM model (may also be referred to as the "look, remember, reason (LRR)" model) 500 may include a convolutional neural network (CNN) 502 and an LLM 506.

The LRR model 500 may be implemented in an auto-regressive framework. The LRR model 500 may be configured with parameters θ. The LRR model 500 may receive an interleaved stream of visual inputs 520 and text inputs 522. The visual inputs 520 may be represented by $I=(v_1, \ldots, v_{t_v})$ and may include (but are not limited to) a sequence of images or video frames of length $t_v$, for example. The text inputs 522 may be represented by $S=(s_1, \ldots, s_{t_s})$ of length $t_s$ and may include words or characters such as a question or a text prompt, for example. For instance, the text may include a query such as "is the size of the green sphere the same as the size of the basketball?" In another example, the text may include a description of a scene such as "There is an object that is both behind the small metal object and to the right of the tiny yellow rubber block . . . " In various aspects, the text inputs 522 may be tokenized (e.g., divided into subparts such as one or more words). The text inputs 522 may include rationales and/or information for answering visual reasoning problems.

In some aspects, the CNN 502 may, for instance, comprise a residual network (ResNet). The CNN 502 may receive the visual inputs I of the interleaved sequence of visual inputs 520 and/or text inputs 522. The CNN 502 may extract lower-level grid-level visual features of the visual inputs I (520) to preserve lower-level visual information. The CNN 502 may be configured to ensure that the LRR model 500 may be broadly applicable across a variety of visual reasoning problems. The CNN 502 may encode the visual input sequence $I=(v_1, \ldots, v_{t_v})$ into a sequence of grid-level features $\bar{I}=(\bar{v}_1, \ldots, \bar{v}_{t_v})$ where $\bar{v}_i=\text{CNN}(v_i)$ and $\bar{v}_i \in \mathbb{R}^{g \times q'}$, where g represents the size of the grid of the visual input and q' represents the dimensionality of the CNN embedding space. The grid-level visual features may be supplied to multilayer perceptrons (MLPs) 504a, 504b. The MLPs 504a, 504b may map the grid-level features for use by the LLM 506 such that the LRR model 500 may employ the grid-level visual features obtained from the CNN 502 to perform visual reasoning tasks.

The LLM 506 may be a pre-trained language model or even an off-the-shelf LLM, for instance. The parameters of the LLM 506 may be initialized from pre-trained LLMs to exploit the existing reasoning capabilities of such language models. However, in some aspects, the LLM 506 may be trained on text only. The visual reasoning tasks may rely on the extraction of visual information about spatial and temporal relationships between objects in the visual input (e.g., a scene). In a multi-modal setup, information of visual inputs I (520) may be mapped to a text-based representation space of the LLM 506. One challenge presented in the multi-modal visual reasoning approach is that in comparison to text (e.g., tokens), images may be highly information-dense.

The LLM 506 may include a self-attention block 508 and a top-down attention block 510. The self-attention block 508 may include self-attention layers 514a, 514b. The self-attention block 508 may receive the text input 522 (e.g., tokens) at a first self-attention layer 514a. The self-attention layers 514a, 514b of the LLM 506 may successively process the input text 522 by applying self-attention. Self-attention may be considered a mechanism that compares each element (e.g., a multi-scale visual feature) of an input with other elements (e.g., the other multi-scale visual features) of the input to identify portions of the input to attend to or focus on. In other words, self-attention allows elements of an input to interact with each other.

The first self-attention layer 514a may be referred to a first embedding layer of the LLM 506 and may encode the text inputs 522 (e.g., tokens) whereas subsequent layers of the LLM 506 may encode progressively richer and more information-dense representations, then encode increasingly global information. Therefore, the embedding layers higher in the hierarchy in the top-down attention mechanism may guide the information extraction process from visual inputs I (520).

The top-down attention block 510 may serve as a mechanism to enable the LLM 506 to directly extract lower-level visual information from the grid-level features of the visual inputs I (520). The top-down attention block 510 may include cross-attention layers 516a, 516b. The cross-attention layers 516a, 516b may be interleaved between self-attention layers in higher layers (e.g., after the self-attention block 508) of the LLM 506. The cross-attention layers 516a, 516b may exploit the rich hierarchical representation encoded in the hidden states $\{h^1, \ldots, h^m\}$ of the LLM 506, where $h^i \in \mathbb{R}^{t \times q}$, m represents a number of self-attention layers (e.g., 514a-d) in the LLM 506, t represents a sequence length $t=t_v+t_s$ and q represents the dimensionality of the embedding space.

The LRR model 500 may employ the cross-attention layers 516a, 516b at higher levels $\{k, \ldots, m\}$ of the hierarchical representation space of the LLM 506 to integrate and "look" for the visual information in the grid-level visual features ($\bar{v}_i$) extracted by the CNN 502. The grid level visual features $\bar{I}$ may be transformed using a multi-layer perceptron (MLP) for each cross-attention layer 516a, 516b. For example, the MLPs 504a, 504b may perform a mapping $MLP_k: \mathbb{R}^{q'} \rightarrow \mathbb{R}^q$ (which may be learned) to transform the grid-level features ($\bar{v}_i$) as $\bar{v}_i^k = MLP_k(\bar{v}_i)$, for input to the cross-attention layers 516a, 516b.

In some aspects, positional embeddings may be concatenated to each grid element $\bar{v}_i^k$ preserve spatial information. The positional embeddings may correspond to positions of the text inputs 522 within the interleaved sequence of visual inputs 520 and text inputs 522. That is, the grid level image features of may be fused with the positional embeddings to enable top-down attention where the LLM 506 may guide the information extraction process using the hidden representation $h^k$. For instance, the hidden representation $\hat{h}^k$ may be employed after the application of the self-attention layer (e.g., 514c) to guide a visual feature extraction process in the cross-attention layer (e.g., 516a). The hidden representation $\hat{h}^k$ may be transformed by a linear projection to serve as a query vector ($Q_s$) and the visual features $\bar{v}_i^k$ may be linearly transformed to keys and values ($K_v$, $V_u$) of the cross-attention layers 516a, 516b respectively as follows:

$$\hat{h}^k = \text{SELF-ATTN}(h^k) \quad (1)$$

$$\bar{v}_i^k = \text{CROSS-ATTN}(\hat{h}^k, \bar{v}_i^k)$$

$$h^{k+1} = h^k + \hat{h}^k + \bar{v}_i^k$$

$$h^{k+1} = \text{FFN}(h^{k+1}) + h^{k+1},$$

where FFN denotes a feed forward layer of the LLM 506. The hidden representation (e.g., state) $\hat{h}^i$ may represent a query vector that encodes global semantics in the cross-attention layers 516a, 516b with the spatial grid features $\bar{v}_i^k$ as keys and values. As such, the LLM 506 may, in turn, generate a rationale 524, which may be used to determine a solution (e.g., an answer) 526. In this way, the LRR model 500 may extract information relevant to solving the visual reasoning problems (e.g., object locations) and the corresponding spatial relationships in $\hat{v}_i^k$, for example.

Accordingly, the LRR model 500 may leverage the flexibility of language models to express diverse lower-level visual tasks through language in a generalized setup. Unlike conventional visual reasoning approaches, aspects of the present disclosure may utilize lower-level visual information for generating rationales for visual reasoning tasks. The lower-level visual information may include surrogate tasks. Examples of such lower-level visual information may include (but are not limited to) detecting, describing, identifying, and/or enumerating objects present in the scene, tracking or reidentifying objects in a video, or understanding spatial relationships between multiple objects in a scene. Given a visual reasoning problem that involves lower-level skills, such as object recognition and spatial reasoning, rationales with surrogate tasks may be determined. In some aspects, the rationale for the task may be based on a position or a track identifier (ID) such as a timestamp, for example.

In some examples, for the lower-level skill of object recognition, a surrogate task of explicitly listing objects in the scene of a visual input may be defined. Similarly, for spatial reasoning skills, the rationales may be designed such that a surrogate task of explicitly listing each of the objects left/right/front/behind a certain target object in a scene of a visual input may be defined. As such, the LRR model 500 may be enabled to understand a spatial relationship of the target object to other objects in the scene.

Moreover, for visual reasoning problems that involve tracking or re-identification, a surrogate task of predicting positions or identifying one or more target objects across video frames may be defined in the rationale. By including such lower-level visual tasks in the rationale, solutions to visual reasoning tasks may beneficially remain within a context window of the LLM 506 so that the lower-level visual tasks may be "remembered" by the LLM 506 and may be exploited to "reason" and solve subsequent tasks. Thus, the LRR model 500 may break down complex visual reasoning tasks into simpler steps and train the LRR model 500 on surrogate tasks for generating rationales 524 about spatial and/or spatio-temporal relationships present in the visual information that are pertinent to the visual reasoning task.

The LRR model 500 may be trained by maximizing a log-likelihood of a next text input 522 (e.g., a token) given the interleaved sequence of previous visual inputs and text, as given by:

$$\log(p_\theta(S)) = \sum_{t'_s} \log(s_{t'_s}|s_1, \cdots, s_{t'_s}-1, V_1, \cdots, V_{t'_v}), \quad (2)$$

where, $(v_1, \ldots, v_{t'_v})$ represents the interleaved visual input sequence up to the text input (e.g., token) $S_{t'_s}$. In various aspects, the LRR model 500 may be trainable end-to-end and lower-level visual skills may be instilled by fine-tuning the LRR model on appropriate surrogate tasks expressed in a natural language.

Figure 6:
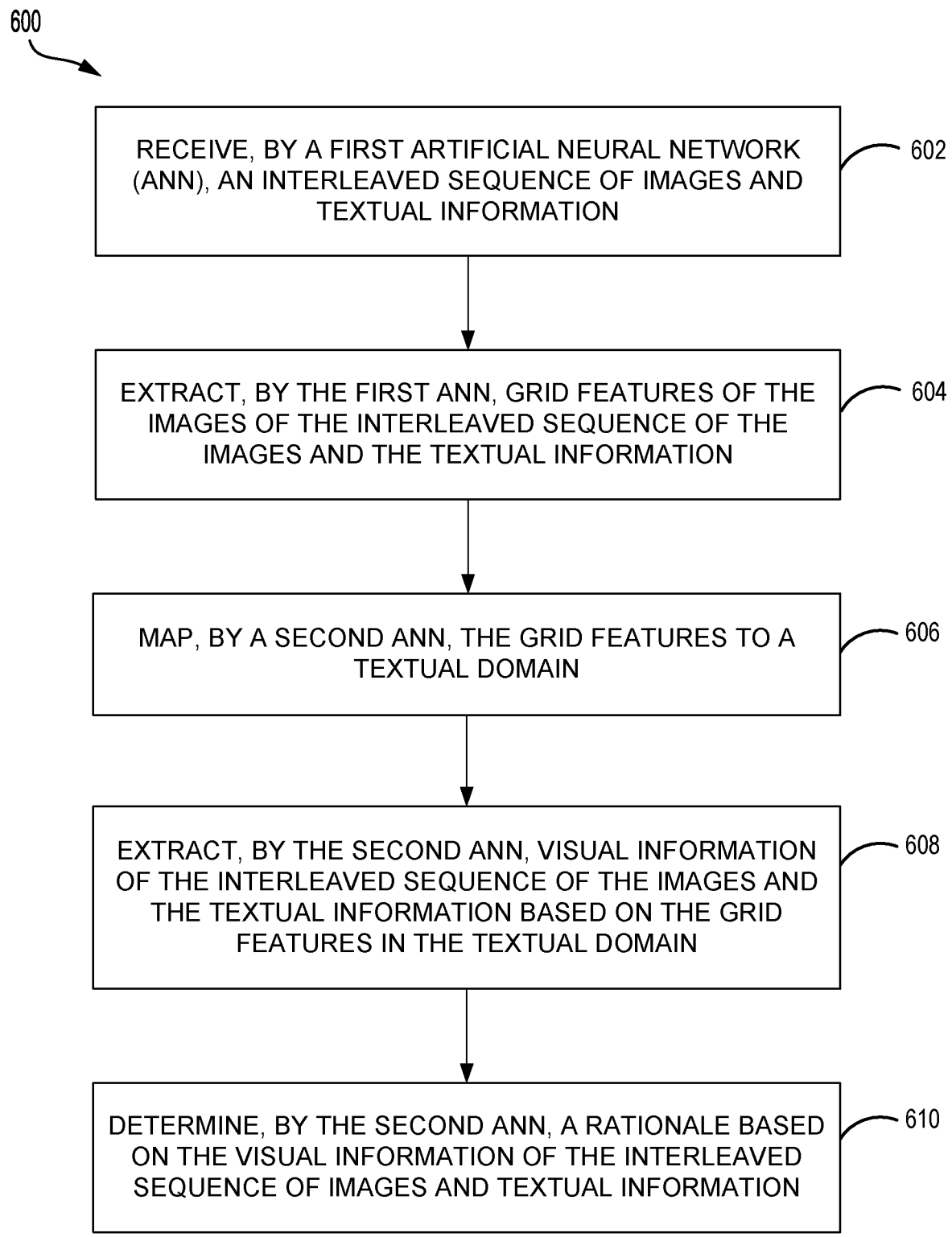
FIG. 6 is a flow diagram illustrating a processor-implemented method for determining a rationale for visual reasoning tasks using an artificial neural network (ANN), in accordance with various aspects of the present disclosure.

FIG. 6 is a flow diagram illustrating a processor-implemented method 600 for determining a rationale for visual reasoning tasks using an artificial neural network (ANN), in accordance with various aspects of the present disclosure. With reference to FIGS. 1-6, the processor-implemented method 600 may be performed by one or more processors, such as the CPU (e.g., 102, 422), GPU (e.g., 104, 426), DSP (e.g., 106, 424), and/or NPU (e.g., 108, 428), for example may be performed by one or more processors, such as the CPU (e.g., 102, 422), GPU (e.g., 104, 426), DSP (e.g., 106, 424), and/or NPU (e.g., 108, 428), for example.

At block 602, the processor receives, by a first artificial neural network (ANN), an interleaved sequence of images and textual information of the interleaved sequence of images and textual information, the visual information comprising one or more lower-level surrogate tasks. The first ANN may comprise a convolutional neural network such as DCN 350 shown in FIG. 3, for example. In some aspects, the textual information may comprise tokenized textual data.

At block 604, the processor extracts, by the first ANN, grid features of the images of the interleaved sequence of the images and the textual information to generate a representation of the interleaved sequence of the images and the textual information based on the grid features. The grid features may include spatio-temporal information of the images of the interleaved sequence of the images and the textual information.

At block 606, the processor maps, by a second ANN, the grid features to a textual domain. The second ANN may comprise a language model for instance. For instance, as described with reference to FIG. 5, the LRR model 500 may employ the cross-attention layers 516a, 516b at higher levels {k, . . . , m} of the hierarchical representation space of the LLM 506 to integrate and "look" for the visual information in the grid-level visual features ($\bar{v}_i$) extracted by the CNN 502. The grid level visual features $\bar{I}$ may be transformed using a multi-layer perceptron (MLP) for each cross-attention layer (516a, 516b). For example, the MLPs (504a, 504b) may perform a mapping $MLP_k: \mathbb{R}^{q''} \to \mathbb{R}^q$ (which may be learned) to transform the grid-level features ($\bar{v}_i$) as $\bar{v}_i^k = MLP_k(\bar{v}_i)$, for input to the cross-attention layers (516a, 516b).

At block 608, the processor extracts, by the second ANN, visual information of the interleaved sequence of the images and the textual information based on the grid features in the textual domain. The second ANN may generate a hidden representation of a query that guides extraction of the visual information of the interleaved sequence of the images and the textual information using cross-attention.

At block 610, the processor determines, by the second ANN, a rationale based on the visual information. The visual information may comprise one or more lower-level surrogate tasks. In some aspects, the visual information may further include constituent aspects of a scene depicted in the interleaved sequence of the images or higher-level tasks inferred from the one or more lower-level surrogate tasks. For instance, the constituent aspects may include an object recognition task, an object re-identification task, an object tracking task, or an object relation task, for example. In some aspects, the rationale may comprise a position or a track identifier (ID) such as a timestamp, for example. In various aspects, the rationale may be used to determine a solution or an answer to a prompt, and/or perform a visual reasoning task, for example, but not limitation.

Implementation examples are provided in the following numbered clauses.

1. An apparatus comprising:
   at least one memory; and
   at least one processor coupled to the at least one memory, the at least one processor configured to:
      receive, by a first artificial neural network (ANN), an interleaved sequence of images and textual information;
      extract, by the first ANN, grid features of the images of the interleaved sequence of the images and the textual information to generate a representation of the interleaved sequence of the images and the textual information based on the grid features;
      map, by a second ANN, the grid features to a textual domain;
      extract, by the second ANN, visual information of the interleaved sequence of the images and the textual information based on the grid features in the textual domain; and
      determine, by the second ANN, a rationale based on the visual information of the interleaved sequence of images and the textual information, the visual information comprising one or more lower-level surrogate tasks.

2. The apparatus of clause 1, in which the visual information further includes constituent aspects of a scene depicted in the interleaved sequence of the images or higher level tasks inferred from the one or more lower-level surrogate tasks, the constituent aspects including one or more of an object recognition task, an object re-identification task, an object tracking task, or an object relation task.

3. The apparatus of clause 1 or 2, in which the at least one processor is further configured to perform, by the second ANN, a visual reasoning task based on the rationale.

4. The apparatus of any of clauses 1-3, in which the grid features comprise spatio-temporal information of the images of the interleaved sequence of the images and the textual information.

5. The apparatus of any of clauses 1-4, in which the at least one processor is further configured to generate, by the second ANN, a hidden representation of a query that guides extraction of the visual information of the interleaved sequence of the images and the textual information using cross-attention.

6. The apparatus of any of clauses 1-5, in which the first ANN comprises a convolutional neural network or a vision transformer based model and the second ANN comprises a language model.

7. The apparatus of any of clauses 1-6, in which the at least one processor is further configured to determine, by the second ANN, the rationale based on a maximum log likelihood of a next token of tokenized textual data based on at least one previous token of the tokenized textual data in the interleaved sequence of the images and the textual information.

8. The apparatus of any of clauses 1-7, in which a determination of whether to generate the rationale is made stochastically during training.

9. A processor-implemented method performed by at least one processor, the processor-implemented method comprising:
   receiving, by a first artificial neural network (ANN), an interleaved sequence of images and textual information;
   extracting, by the first ANN, grid features of the images of the interleaved sequence of the images and the textual information to generate a representation of the interleaved sequence of the images and the textual information based on the grid features;

mapping, by a second ANN, the grid features to a textual domain;

extracting, by the second ANN, visual information of the interleaved sequence of the images and the textual information based on the grid features in the textual domain; and determining, by the second ANN, a rationale based on the visual information of the interleaved sequence of images and the textual information, the visual information comprising one or more lower-level surrogate tasks.

10. The processor-implemented method of clause 9, in which the visual information further includes constituent aspects of a scene depicted in the interleaved sequence of the images or higher level tasks inferred from the one or more lower-level surrogate tasks, the constituent aspects including one or more of an object recognition task, an object re-identification task, an object tracking task, or an object relation task.

11. The processor-implemented method of clause 9 or 10, further comprising performing, by the second ANN, a visual reasoning task based on the rationale.

12. The processor-implemented method of any of clauses 9-11, in which the grid features comprise spatio-temporal information of the images of the interleaved sequence of the images and the textual information.

13. The processor-implemented method of any of clauses 9-12, further comprising generating, by the second ANN, a hidden representation of a query that guides extraction of the visual information of the interleaved sequence of the images and the textual information using cross-attention.

14. The processor-implemented method of any of clauses 9-13, in which the first ANN comprises a convolutional neural network or a vision transformer based model and the second ANN comprises a language model.

15. The processor-implemented method of any of clauses 9-14, further comprising determining, by the second ANN, the rationale based on a maximum log likelihood of a next token of tokenized textual data based on at least one previous token of the tokenized textual data in the interleaved sequence of the images and the textual information.

16. The processor-implemented method of any of clauses 9-15 in which a determination of whether to generate the rationale is made stochastically during training.

17. A non-transitory computer-readable medium having program code recorded thereon, the program code executed by a processor and comprising:

program code to receive, by a first artificial neural network (ANN), an interleaved sequence of images and textual information;

program code to extract, by the first ANN, grid features of the images of the interleaved sequence of the images and the textual information to generate a representation of the interleaved sequence of the images and the textual information based on the grid features;

program code to map, by a second ANN, the grid features to a textual domain;

program code to extract, by the second ANN, visual information of the interleaved sequence of the images and the textual information based on the grid features in the textual domain; and program code to determine, by the second ANN, a rationale based on the visual information of the interleaved sequence of images and the textual information, the visual information comprising one or more lower-level surrogate tasks.

18. The non-transitory computer-readable medium of clause 17, in which the visual information further includes constituent aspects of a scene depicted in the interleaved sequence of the images or higher level tasks inferred from the one or more lower-level surrogate tasks, the constituent aspects including one or more of an object recognition task, an object re-identification task, an object tracking task, or an object relation task.

19. The non-transitory computer-readable medium of clause 17 or 18, in which the program code comprises program code to perform, by the second ANN, a visual reasoning task based on the rationale.

20. The non-transitory computer-readable medium of any of clauses 17-19, in which the grid features comprise spatio-temporal information of the images of the interleaved sequence of the images and the textual information.

21. The non-transitory computer-readable medium of any of clauses 17-20, in which the program code comprises program code to generate, by the second ANN, a hidden representation of a query that guides extraction of the visual information of the interleaved sequence of the images and the textual information using cross-attention.

22. The non-transitory computer-readable medium of any of clauses 17-21, in which the first ANN comprises a convolutional neural network or a vision transformer based model and the second ANN comprises a language model.

23. The non-transitory computer-readable medium of any of clauses 17-22, in which the program code comprises program code to determine, by the second ANN, the rationale based on a maximum log likelihood of a next token of tokenized textual data based on at least one previous token of the tokenized textual data in the interleaved sequence of the images and the textual information.

24 An apparatus comprising:

means for receiving, by a first artificial neural network (ANN), an interleaved sequence of images and textual information;

means for extracting, by the first ANN, grid features of the images of the interleaved sequence of the images and the textual information to generate a representation of the interleaved sequence of the images and the textual information based on the grid features;

means for mapping, by a second ANN, the grid features to a textual domain;

means for extracting, by the second ANN, visual information of the interleaved sequence of the images and the textual information based on the grid features in the textual domain; and means for determining, by the second ANN, a rationale based on the visual information of the interleaved sequence of images and the textual information, the visual information comprising one or more lower-level surrogate tasks.

25. The apparatus of clause 24, in which the visual information further includes constituent aspects of a scene depicted in the interleaved sequence of the images or higher level tasks inferred from the one or more lower-level surrogate tasks, the constituent aspects including one or more of an object recognition task, an object re-identification task, an object tracking task, or an object relation task.

26. The apparatus of clause 24 or 25, further comprising means for performing, by the second ANN, a visual reasoning task based on the rationale.
27. The apparatus of any of clauses 24-26, in which the grid features comprise spatio-temporal information of the images of the interleaved sequence of the images and the textual information.
28. The apparatus of any of clauses 24-27, further comprising means for generating, by the second ANN, a hidden representation of a query that guides extraction of the visual information of the interleaved sequence of the images and the textual information using cross-attention.
29. The apparatus of any of clauses 24-28, in which the first ANN comprises a convolutional neural network or a vision transformer based model and the second ANN comprises a language model.
30. The apparatus of any of clauses 24-29, further comprising means for determining, by the second ANN, the rationale based on a maximum log likelihood of a next token of tokenized textual data based on at least one previous token of the tokenized textual data in the interleaved sequence of the images and the textual information.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database, or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. An apparatus comprising:
   at least one memory; and
   at least one processor coupled to the at least one memory, the at least one processor configured to:
   receive, by a first artificial neural network (ANN), an interleaved sequence of images and textual information;
   extract, by the first ANN, grid features of the images of the interleaved sequence of the images and the textual information to generate a representation of the interleaved sequence of the images and the textual information based on the grid features;
   map, by a second ANN, the grid features to a textual domain;
   extract, by the second ANN, visual information of the interleaved sequence of the images and the textual information based on the grid features in the textual domain; and determine, by the second ANN, a rationale based on the visual information of the interleaved sequence of images and the textual information, the visual information comprising one or more lower-level surrogate tasks.

2. The apparatus of claim 1, in which the visual information further includes constituent aspects of a scene depicted in the interleaved sequence of the images or higher level tasks inferred from the one or more lower-level surrogate tasks, the constituent aspects including one or more of an object recognition task, an object re-identification task, an object tracking task, or an object relation task.

3. The apparatus of claim 1, in which the at least one processor is further configured to perform, by the second ANN, a visual reasoning task based on the rationale.

4. The apparatus of claim 1, in which the grid features comprise spatio-temporal information of the images of the interleaved sequence of the images and the textual information.

5. The apparatus of claim 1, in which the at least one processor is further configured to generate, by the second ANN, a hidden representation of a query that guides extraction of the visual information of the interleaved sequence of the images and the textual information using cross-attention.

6. The apparatus of claim 1, in which the first ANN comprises a convolutional neural network or a vision transformer based model and the second ANN comprises a language model.

7. The apparatus of claim 1, in which the at least one processor is further configured to determine, by the second ANN, the rationale based on a maximum log likelihood of a next token of tokenized textual data based on at least one previous token of the tokenized textual data in the interleaved sequence of the images and the textual information.

8. The apparatus of claim 1, in which a determination of whether to generate the rationale is made stochastically during training.

9. A processor-implemented method performed by at least one processor, the processor-implemented method comprising:
receiving, by a first artificial neural network (ANN), an interleaved sequence of images and textual information;
extracting, by the first ANN, grid features of the images of the interleaved sequence of the images and the textual information to generate a representation of the interleaved sequence of the images and the textual information based on the grid features;
mapping, by a second ANN, the grid features to a textual domain;
extracting, by the second ANN, visual information of the interleaved sequence of the images and the textual information based on the grid features in the textual domain; and
determining, by the second ANN, a rationale based on the visual information of the interleaved sequence of images and the textual information, the visual information comprising one or more lower-level surrogate tasks.

10. The processor-implemented method of claim 9, in which the visual information further includes constituent aspects of a scene depicted in the interleaved sequence of the images or higher level tasks inferred from the one or more lower-level surrogate tasks, the constituent aspects including one or more of an object recognition task, an object re-identification task, an object tracking task, or an object relation task.

11. The processor-implemented method of claim 9, further comprising performing, by the second ANN, a visual reasoning task based on the rationale.

12. The processor-implemented method of claim 9, in which the grid features comprise spatio-temporal information of the images of the interleaved sequence of the images and the textual information.

13. The processor-implemented method of claim 9, further comprising generating, by the second ANN, a hidden representation of a query that guides extraction of the visual information of the interleaved sequence of the images and the textual information using cross-attention.

14. The processor-implemented method of claim 9, in which the first ANN comprises a convolutional neural network or a vision transformer based model and the second ANN comprises a language model.

15. The processor-implemented method of claim 9, further comprising determining, by the second ANN, the rationale based on a maximum log likelihood of a next token of tokenized textual data based on at least one previous token of the tokenized textual data in the interleaved sequence of the images and the textual information.

16. The processor-implemented method of claim 9, in which a determination of whether to generate the rationale is made stochastically during training.

17. A non-transitory computer-readable medium having program code recorded thereon, the program code executed by a processor and comprising:
program code to receive, by a first artificial neural network (ANN), an interleaved sequence of images and textual information;
program code to extract, by the first ANN, grid features of the images of the interleaved sequence of the images and the textual information to generate a representation of the interleaved sequence of the images and the textual information based on the grid features;
program code to map, by a second ANN, the grid features to a textual domain;
program code to extract, by the second ANN, visual information of the interleaved sequence of the images and the textual information based on the grid features in the textual domain; and
program code to determine, by the second ANN, a rationale based on the visual information of the interleaved sequence of images and the textual information, the visual information comprising one or more lower-level surrogate tasks.

18. The non-transitory computer-readable medium of claim 17, in which the visual information further includes constituent aspects of a scene depicted in the interleaved sequence of the images or higher level tasks inferred from the one or more lower-level surrogate tasks, the constituent aspects including one or more of an object recognition task, an object re-identification task, an object tracking task, or an object relation task.

19. The non-transitory computer-readable medium of claim 17, in which the program code comprises program code to perform, by the second ANN, a visual reasoning task based on the rationale.

20. The non-transitory computer-readable medium of claim 17, in which the grid features comprise spatio-temporal information of the images of the interleaved sequence of the images and the textual information.

21. The non-transitory computer-readable medium of claim 17, in which the program code comprises program code to generate, by the second ANN, a hidden representation of a query that guides extraction of the visual information of the interleaved sequence of the images and the textual information using cross-attention.

22. The non-transitory computer-readable medium of claim 17, in which the first ANN comprises a convolutional neural network or a vision transformer based model and the second ANN comprises a language model.

23. The non-transitory computer-readable medium of claim 17, in which the program code comprises program code to determine, by the second ANN, the rationale based on a maximum log likelihood of a next token of tokenized textual data based on at least one previous token of the tokenized textual data in the interleaved sequence of the images and the textual information.

24. An apparatus comprising:
means for receiving, by a first artificial neural network (ANN), an interleaved sequence of images and textual information;
means for extracting, by the first ANN, grid features of the images of the interleaved sequence of the images and the textual information to generate a representation of the interleaved sequence of the images and the textual information based on the grid features;
means for mapping, by a second ANN, the grid features to a textual domain;
means for extracting, by the second ANN, visual information of the interleaved sequence of the images and the textual information based on the grid features in the textual domain; and
means for determining, by the second ANN, a rationale based on the visual information of the interleaved sequence of images and the textual information, the visual information comprising one or more lower-level surrogate tasks.

25. The apparatus of claim 24, in which the visual information further includes constituent aspects of a scene depicted in the interleaved sequence of the images or higher level tasks inferred from the one or more lower-level surrogate tasks, the constituent aspects including one or more of an object recognition task, an object re-identification task, an object tracking task, or an object relation task.

26. The apparatus of claim 24, further comprising means for performing, by the second ANN, a visual reasoning task based on the rationale.

27. The apparatus of claim 24, in which the grid features comprise spatio-temporal information of the images of the interleaved sequence of the images and the textual information.

28. The apparatus of claim 24, further comprising means for generating, by the second ANN, a hidden representation of a query that guides extraction of the visual information of the interleaved sequence of the images and the textual information using cross-attention.

29. The apparatus of claim 24, in which the first ANN comprises a convolutional neural network or a vision transformer based model and the second ANN comprises a language model.

30. The apparatus of claim 24, further comprising means for determining, by the second ANN, the rationale based on a maximum log likelihood of a next token of tokenized textual data based on at least one previous token of the tokenized textual data in the interleaved sequence of the images and the textual information.

* * * * *